United States Patent [19]
Krumbein

[11] 3,811,761
[45] May 21, 1974

[54] DRIVE MEANS FOR FILM ADVANCING SPROCKETS IN CINEMATOGRAPHIC APPARATUS

[75] Inventor: Fritz Krumbein, Stuttgart-Mohringen, Germany

[73] Assignee: Robert Bosch Photokino GmbH, Stuttgart, Germany

[22] Filed: Mar. 9, 1973

[21] Appl. No.: 339,942

[30] Foreign Application Priority Data
Mar. 14, 1972 Germany............................ 2212164

[52] U.S. Cl.................. 352/166, 226/25, 242/191, 352/174
[51] Int. Cl. ............................................ G03b 1/00
[58] Field of Search .......... 352/166, 174, 176, 157, 352/158, 159, 91, 92; 242/191; 226/25

[56] References Cited
UNITED STATES PATENTS
3,432,229  3/1969  Freudenschusz.................... 352/176

*Primary Examiner*—Monroe H. Hayes
*Attorney, Agent, or Firm*—Michael S. Striker

[57] ABSTRACT

A motion picture camera or projector wherein the film is transported by at least one sprocket which is normally driven by a worm wheel meshing with an axially reciprocable worm on the shutter shaft. When the resistance which the sprocket offers to rotation in response to increasing tension of film rises to a predetermined value, the worm wheel causes the worm to move axially against the opposition of a prestressed spring whereby one or more jaws on the worm become disengaged from one or more jaws of a clutch element which is secured to the shutter shaft to thereby interrupt the torque-transmitting connection between the shaft and the sprocket. The tension of film increases to a value at which the resistance which the sprocket offers to further rotation overcomes the bias of the spring when the film is completely withdrawn from the supply reel but the sprocket continues to rotate due to inertia of the shutter shaft and after total consumption of one or more loops which the film normally forms between the supply reel and the sprocket.

11 Claims, 2 Drawing Figures

DRIVE MEANS FOR FILM ADVANCING SPROCKETS IN CINEMATOGRAPHIC APPARATUS

BACKGROUND OF THE INVENTION

The present invention relates to cinematographic apparatus in general, and more particularly to improvements in mechanisms for transporting film in motion picture cameras or projectors. Still more particularly, the invention relates to improvements in film transporting mechanisms of the type wherein the film is moved lengthwise by one or more rotary advancing devices, particularly by one or more sprockets which are driven by the prime mover of the cinematographic apparatus. (see the U.S. Pat. Nos. 2,513,085; 2,592,285; 3,063,651)

It is already known to provide a motion picture camera or projector with a suitable detector which automatically disconnects the prime mover for one or more film advancing sprockets from the energy source when the supply of convoluted film on the supply or takeup reel is exhausted. It is further known to provide such cinematographic apparatus with suitable loop forming means serving to loop the film between the reel which pays out the film and the sprocket or sprockets in order to avoid tearing of film in the region of the perforations when the supply of film on the supply or takeup reel is exhausted but the sprocket or sprockets continue to rotate due to inertia of the prime mover and/or due to inertia of component parts of the power train which is provided win the apparatus to transmit torque from the prime mover to the sprocket or sprockets. The looping of film in cinematographic apparatus serves the additional purpose of compensating for the fact that the film collecting reel is driven at a constant speed whereas the pull-down is operated intermittently in order to place successive frames of motion picture film into register with the film gate. In motion picture projectors which are provided with means for reproducing sound from one or more sound tracks of the film, the film must also travel continuously through the sound reproducing unit, i.e., along one or more sound heads. It was found that, when the supply of film on the reel from which the film is being withdrawn is exhausted and the prime mover is automatically disconnected from the energy source, the moving parts of the mechanism which rotates one or more sprockets continue to rotate by inertia for an interval of time long enough to cause complete consumption of one or more loops which are formed in the film between the just mentioned reel and the foremost sprocket. Consequently, the film is automatically arrested as soon as the loop or loops are fully consumed whereas the sprocket or sprockets continue to rotate due to inertia of the drive means therefor so that the film is likely to be damaged in the region of perforations which receive the teeth of the sprockets. As a rule, the length of loops between the reel which pays out the film and the nearest sprocket corresponds to the combined length of about five film frames, i.e., the loop or loops can be consumed within an interval of time which is often such shorter than the interval which elapses between the moment of disconnection of the prime mover from its energy source and the moment of complete stoppage of the sprocket or sprockets. The loop forming means often comprises suitable elastic elements which can undergo a certain amount of deformation in response to increasing tension of the film. Such loop forming means are normally mounted upstream and downstream of the film gate.

If a motion picture film which has been damaged in the region of its perforations is to be viewed again by resorting to a motion picture projector, the pull-down is incapable of moving all of the film frames into accurate register with the film gate so that the quality of image reproduction is poor. Moreover, the aforementioned detector means for disconnecting the prime mover from the energy source is incapable of operating satisfactorily because the sprocket or sprockets cannot properly tension the film when their teeth extend into defective perforations. Insufficient tensioning of film cannot result in proper deflection of the mobile part of a mechanical detector so that the latter cannot disconnect the prime mover at the exact moment when the tension of film rises up to a maximum permissible value.

It was already proposed to provide in a cinematographic apparatus means for automatically disengaging a film advancing sprocket from its drive when the tension of film rises to a predetermined value. (e.g., the means shown in U.S. Pat. Nos. 2,513,085 and 3,063,651) Conventional disengaging means are rather complex, expensive and unreliable. As a rule, such disengaging means employ an electromagnet which is energized in response to detection of information which is encoded on the moving film and is provided for the express purpose of initiating a disconnection of the sprocket from its drive means when the supply of film on the reel which pays out the film is about to be exhausted. A further serious drawback of such disengaging means is that it cannot respond to increasing tension of film in the event that increasing tension is due to other factors, i.e., not to impending or actual exhaustion of film on the reel which pays out the film. The detector of a conventional disconnecting device for the prime mover is normally mounted close to the supply reel and is often remote from the foremost sprocket so that such device cannot react to increasing film tension which develops between its detector and the foremost sprocket. Thus, even if the aforementioned electromagnet were to be controlled by the detector of the disconnecting device for the prime mover, it would be incapable of disengaging the sprocket or sprockets from their drive means whenever the tension of film rises beyond a permissible value.

SUMMARY OF THE INVENTION

An object of the invention is to provide a cinematographic apparatus with novel and improved drive means for one or more rotary film advancing devices, such as sprockets, which automatically terminates the transmission of torque to the advancing device or devices when the tension of film rises to a predetermined maximum permissible value irrespective of the cause or origin of increaseed tension.

Another object of the invention is to provide a motion picture projector or camera with novel and improved means for disconnecting a film advancing sprocket from its drive means in automatic response to such tensioning of film which is due to the fact that the supply of film on the reel which pays out the film is exhausted as well as in automatic response to other causes of excessive film tensioning upstream of the sprocket.

A further object of the invention is to provide novel and improved drive means for one or more sprockets in cinematographic apparatus.

An additional object of the invention is to provide a cinematographic apparatus with novel drive means which can rotate one or more film advancing sprockets in such a way that the sprockets are automatically disconnected from the prime mover in response to excessive tensioning of film and whose space requirements do not exceed the space requirements of conventional drive means.

The invention resides in the provision of a cinematographic apparatus (e.g., a motion picture projector) which comprises rotary film advancing means (e.g., a customary sprocket installed between a supply reel for motion picture film and the film gate) which is arranged to offer a variable resistance to rotation in response to changing tension of motion picture film, and novel drive means which is arranged to rotate the advancing means and includes a rotary driven member (e.g., a worm wheel or a helical gear) which is rotatable with the advancing means, a rotary driving member for the driven member, and prime mover means (e.g., the shutter shaft) for rotating the driving member. In accordance with a feature of the invention, the driving member is movable (preferably axially) between first and second positions in which it respectively receives torque and is disengaged from the prime mover means and the driven member is arranged to urge the driving member toward the second position with a force which increases proportionally with increasing resistance which the advancing means offers to rotation in response to increasing tension of the film. The drive means for the advancing means further comprises biasing means (e.g., a prestressed helical spring whose bias is adjustable) for urging the driving member to the first position with a predetermined force which is overcome by the advancing means in response to a predetermined tension of the film. Thus, and since the force with which the biasing means urges the driving member to its first position can be adjusted at will, the advancing means can be automatically disconnected from the prime mover means as soon as the tension of film rises to a value at which the film is likely to be damaged in the region of its perforations were the advancing means still connected to the prime mover means. It will be seen that, whereas the advancing means is free to rotate in response to rotation of the driving and driven members of the drive means (also when such members rotate due to inertia after the prime mover means is disconnected from the energy source in a customary way not forming part of the present invention), the rotation of advancing means and driven member is terminated abruptly as soon as the tension of film (irrespective of the cause or origin of such tension) rises to a predetermined maximum permissible value.

The novel features which are considered as characteristic of the invention are set forth in particular in the appended claims. The improved cinematographic apparatus itself, however, both as to its construction and its mode of operation, together with additional features and advantages thereof, will be best understood upon perusal of the following detailed description of certain specific embodiments with reference to the accompanying drawing.

DESCRIPTION OF THE PREFERRED EMBODIMENTS

Figure 1:
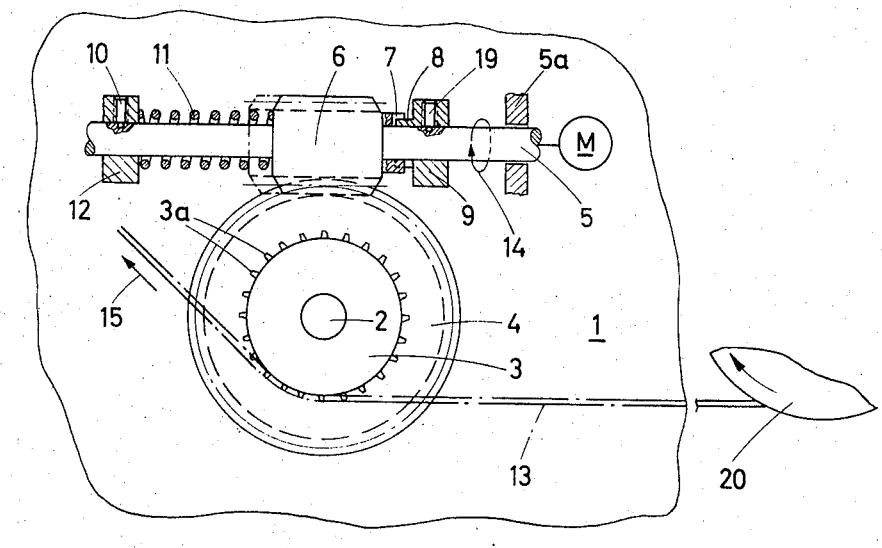
FIG. 1 is an enlarged fragmentary sectional view of a cinematographic apparatus including a sprocket and drive means which serves to rotate the sprocket and is constructed and assembled in accordance with one embodiment of the present invention.

Referring to FIG. 1 in detail, there is shown a portion of a motion picture projector which comprises a housing 1 supporting the shaft 2 for a film advancing sprocket 3. The drive means for this sprocket comprises a prime mover M (e.g., an electric motor) whose shaft 5 drives a rotary shutter (not shown) and is rotatable in bearing means 5a installed in the housing 1. The drive means further includes a rotary driven member 4 (here shown as a worm wheel) which is coaxial with and serves to rotate the sprocket 3, a rotary driving member 6 (here shown as a worm) which mates with the worm wheel 4 and is movable axially of the shaft 5 between a first position (indicated by solid lines) in which it receives torque from the shaft 5 and a second position (indicated by phantom lines) in which it cannot be rotated by the shaft 5. The worm 6 is permanently biased to the first position by suitable biasing means here shown as including a helical spring 11 which surrounds the shaft 5 and biases the worm 6 in a direction to the right, as viewed in the drawing. The spring 11 reacts against an annular retainer 12 which is secured to the shaft 5 by a radial screw 10. The retainer 12 and the screw 10 constitute an adjusting means for changing the initial stress of the spring 11 and hence the force with which the spring 11 urges the worm 6 to the first position. The bias of the spring 11 can be overcome by the sprocket 3 in response to increasing tension of motion picture film 13 which is assumed to be paid out by a supply reel 20 and to be collected by a takeup reel, not shown. The sprocket 3 is assumed to be located upstream of the customary film gate and its resistance to rotation with the worm wheel 4 rises to a predetermined maximum permissible value when the tension of film 13 approaches that value at which the film is likely to be damaged by the teeth 3a of the sprocket 3 if the latter were permitted to continue to rotate after the supply of film on the supply reel 20 has been exhausted and after the loop or loops (if any) between the reel 20 and sprocket 3 are consumed in response to rotation of the sprocket 3 in a clockwise direction, as viewed in FIG. 1. In normal operation, the motor M is assumed to rotate the shaft 5 in the direction indicated by an arrow 14 whereby the film 13 is caused to move forwardly (see the arrow 15) so as to advance from the supply reel 20 toward the takeup reel.

The drive means for the sprocket 3 further comprises a clutch which can transmit torque from the shaft 5 to the worm 6 as long as the latter assumes the first position. This clutch includes a ring-shaped clutch element 9 which is secured to the shaft 5 by a radial screw 19 and has one or more jaws 8 extending toward the worm 6. The latter is also provided with a clutch element including one or more jaws 7 which engage with and are rotated by the jaws 8 in the first axial position of the worm 6.

The worm wheel 4 may be made integral with or is separably connected to the sprocket 3. It is also within the purview of the invention to replace the worm wheel 4 with a first helical gear 21 (FIG. 2) which can rotate the sprocket 3 and to replace the worm 6 with a second helical gear 22 which is in mesh with the first helical gear 21 and is movable axially of the shaft 5 under the bias or against the opposition of the spring 11 or analogous biasing means.

The operation of the structure shown in FIG. 1 is as follows:

When the projector is in use and its optical system projects the images of successive film frames onto a screen or the like, the motor M rotates the shaft 5 in the direction indicated by the arrow 14 whereby the worm 6 rotates the worm wheel 4 and sprocket 3 so that the teeth 3a transport the film 13 in the direction indicated by the arrow 15. As soon as the supply of film 13 on the core of the supply reel 20 is exhausted (the trailing end of the film 13 is assumed to be fixed to the core of the supply reel), the tension of the film between the supply reel and the sprocket 3 increases, i.e., the sprocket offers a greater resistance to rotation with the worm wheel 4. Consequently, the worm wheel 4 causes the worm 6 to move axially against the opposition of the spring 11 and to become disengaged from the clutch element 9 when the tension of film 13 reaches a maximum permissible value. The sprocket 3 is then arrested while the shaft 5 is free to rotate due to its inertia or because it is still driven by the motor M. As a rule, the increasing tension of film 13 is monitored by a suitable detector (not shown) which disconnects the motor M from the energy source but the parts of the power train between the sprocket 3 and the motor M continue to rotate due to inertia. The purpose of the axially movable worm 6 is to prevent damage to the film 13 due to such rotation of component parts of the power train which is due to their inertia. As mentioned before, the interval which is required for complete stoppage of all moving arts after the motor M is disconnected from the energy source (e.g., by a switch which is controlled by the aforementioned detector) is normally longer than the interval which is required by the sprocket 3 to eliminate, after stoppage of the supply reel 20, one or more loops which might have existed between the supply reel and the sprocket. When the last loop is consumed, the tension of film 13 rises abruptly and the sprocket 3 immediately causes the worm wheel 4 to move the worm 6 to the second position so that the sprocket 3 comes to a halt and its teeth 3a are unable to damage the film.

An important advantage of the improved drive means for the sprocket 3 is that its space requirements are minimal and that it can disconnect the sprocket from the prime mover means (motor M and shaft 5) without necessitating the provision of complex, bulky and expensive additional parts. In fact, the only additional parts which must be provided in order to enable the sprocket 3 to cause the worm 6 22 to become disengaged from the shaft 5 are the clutch and the spring 11. All other parts of the drive means are normally needed in conventional drive means for sprockets which cannot be disengaged from the prime mover or which can be disengaged only in response to detection of information which is encoded on the film.

Figure 2:
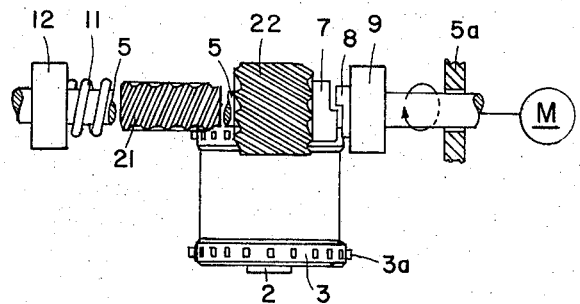
FIG. 2 is a fragmentary plan view of a modified cinematographic apparatus.

The clutch element 9 serves as a stop for automatically arresting the worm 6 in the solid-line position of FIG. 1 or the gear 22 in the position shown in FIG. 2, i.e., the clutch element 9 prevents the worm 6 or gear 22 from moving beyond the first position under the action of the spring 11.

Without further analysis, the foregoing will so fully reveal the gist of the present invention that others can, by applying current knowledge, readily adapt it for various applications without omitting features which fairly constitute essential characteristics of the generic and specific aspects of my contribution to the art and, therefore, such adaptations should and are intended to be comprehended within the meaning and range of equivalence of the claims.

What is claimed as new and desired to be protected by letters Patent is set forth in the appended claims.

1. In a cinematographic apparatus, a combination comprising rotary film advancing means arranged to offer a variable resistance to rotation in response to changing tension of motion picture film; and drive means for rotating said advancing means, including a driven member rotatable with said advancing means, a rotary driving member for said driven member and prime mover means for rotating said driving member, aid driving member being movable between first and second positions in which it respectively receives torque and is disengaged from said prime mover means and said driven member being arranged to urge said driving member toward said second position with a force which increases with increasing resistance which said advancing means offers to rotation with said driven member, said drive means further comprising biasing means for urging said driving member to said first position with a predetermined force which is overcome by said advancing means in response to a predetermined tension of the film.

2. A combination as defined in claim 1, wherein said advancing means comprises at least one sprocket.

3. A combination as defined in claim 1, wherein said driving member is movable axially between said first and second positions thereof.

4. A combination as defined in claim 1, wherein one of said members is a worm wheel and the other of said members is a worm.

5. A combination as defined in claim 1, wherein said members are helical gears.

6. A combination as defined in claim 1, wherein said prime mover means comprises a drive shaft and said driving member is mounted on said shaft for axial movement between said first and second positions thereof.

7. A combination as defined in claim 6, wherein said driven member is coaxial to and rigid with said advancing means and includes a worm wheel, said driving member including a worm which meshes with said worm wheel in each axial position of said driving member.

8. A combination as defined in claim 6, wherein said drive means further comprises clutch means including a first clutch element on said shaft and a second clutch element provided on said driving member and receiving torque from said first clutch element in said first position of said driving member.

9. A combination as defined in claim 8, wherein said first clutch element constitutes a stop against movement of said driving member beyond said first position under the action of said biasing means.

10. A combination as defined in claim 6, wherein said biasing means comprises a prestressed helical spring surrounding said shaft and bearing against said driving member, and retainer means provided on said shaft for said helical spring.

11. A combination as defined in claim 1, further comprising adjusting means for changing said force of said biasing means to thereby select that film tension at which said advancing means causes said driven member to move said driving member to said second position.

* * * * *